United States Patent
Rane et al.

(10) Patent No.: US 8,156,033 B2
(45) Date of Patent: Apr. 10, 2012

(54) DIGITAL PRINT PROCUREMENT USING REVERSE AUCTION

(75) Inventors: Harsha Rane, Solon, OH (US); Matthew Kleiderman, Salem, MA (US); Lawrence Flusser, Palos Verdes Estates, CA (US)

(73) Assignee: Xerox Corporation, Norwalk, CT (US)

( * ) Notice: Subject to any disclaimer, the term of this patent is extended or adjusted under 35 U.S.C. 154(b) by 451 days.

(21) Appl. No.: 12/116,316

(22) Filed: May 7, 2008

(65) Prior Publication Data
US 2009/0281878 A1    Nov. 12, 2009

(51) Int. Cl.
*G06Q 40/00* (2012.01)
(52) U.S. Cl. .......................................... 705/37
(58) Field of Classification Search ............ 705/37; 379/114.02
See application file for complete search history.

(56) References Cited

U.S. PATENT DOCUMENTS

| | | | |
|---|---|---|---|
| 6,032,004 A | 2/2000 | Mirabella, Jr. et al. | |
| 7,065,567 B1 | 6/2006 | Squires et al. | |
| 7,330,833 B1 * | 2/2008 | Robb et al. | 705/37 |
| 2002/0077959 A1 * | 6/2002 | Alaia et al. | 705/37 |
| 2002/0099577 A1 * | 7/2002 | Black | 705/7 |
| 2004/0246967 A1 * | 12/2004 | Killermann | 370/395.2 |
| 2005/0049937 A1 | 3/2005 | Sanders | |
| 2006/0109964 A1 * | 5/2006 | Skelton | 379/114.02 |
| 2006/0167816 A1 | 7/2006 | Wang et al. | |

FOREIGN PATENT DOCUMENTS

JP    2001-319101    11/2001

OTHER PUBLICATIONS

The Fading Reverse Auction. Printing Impressions. Aug. 2008. vol. 51, Issue 3. p. 64, 2 pages.*
Going, Going, Gone—Reverse Auctions. Canadian Printer. Apr./May 2003. vol. 111. Issue 3, p. 29.*
Destination: Digital. Printing Impressions. Mar. 2006; 48, 10.*

* cited by examiner

*Primary Examiner* — Hani M Kazimi
*Assistant Examiner* — John Preston
(74) *Attorney, Agent, or Firm* — Gibb I.P. Law Firm, LLC

(57) ABSTRACT

A method of communicating with different print entities receives a print job and evaluates the print job as either a digital print job and/or an offset print job. The method can perform a live or off-line reverse auction for the digital print job and/or the offset print job by offering the digital print job and the offset print job to printing entities and receiving bids for the digital print job and the offset print job from the printing entities. The bids for the digital print job are based upon the number of images within the digital print job, and the bids for the offset print job are based upon the number of sheets within the offset print job. The bids are evaluated to rank the bids (or to rank the printing entities) into a ranking, which is output.

16 Claims, 7 Drawing Sheets

Imaging:

| | Color | Coverage | | Paper | Pages | Duplex |
|---|---|---|---|---|---|---|
| Image1 | Full Color ▾ | Normal ▾ | | paper1 ▾ | 4 | ☑ |
| Image2 | Black Only ▾ | Normal ▾ | | paper1 ▾ | 2 | ☑ |
| Bleed | ☐ | | | | | |

Digital

Colors:

| | 4-Color | Coverage | #PMS | Coverage | #Metallic | Coverage | Sealer | Total | Coating |
|---|---|---|---|---|---|---|---|---|---|
| Front | ☑ | Light ▾ | 0 | None ▾ | 0 | None ▾ | None ▾ | 4 | None ▾ |
| Back | ☑ | Light ▾ | 0 | None ▾ | 0 | None ▾ | None ▾ | 4 | None ▾ |
| Common | ☑ | | 0 | | 0 | | | 4 | |
| Bleed | ☐ | PMS Colors | | | | | | | |

Offset

FIG. 3

Commercial Print Job: Sample
Step: Preview Rates

Job
Definition
Press: Cover
Press: Text
Additional: Cover
Additional: Text
Assembly
Confirmation
Preview Rates Ratecard Prices Filter Vendors By: Region ▸   United Kingdom ▸

| Supplier | Press | Price 10,000 △ | | Price @ Quantity 12,000 △ | | Price |
|---|---|---|---|---|---|---|
| DemoVendor 1 | Offset | £22,573.22 | ☐ | £27,087.86 | ☐ | £33,859.83 |
| | Digital | £22,573.22 | ☐ | £27,087.86 | ☐ | £33,859.83 |
| DemoVendor 2 | Offset | £24,392.46 | ☐ | £27,734.68 | ☐ | £37,345.22 |
| | Digital | £24,392.46 | ☐ | £27,734.68 | ☐ | £37,345.22 |
| DemoVendor 3 | Offset | £26,375.22 | ☐ | £28,087.86 | ☐ | £34,262.38 |
| | Digital | £24,392.46 | ☐ | £27,734.68 | ☐ | £37,345.22 |
| DemoBaseline | Offset | £22,573.22 | ☐ | £27,087.86 | ☐ | £33,859.83 |
| | Digital | £24,392.46 | ☐ | £27,734.68 | ☐ | £37,345.22 |

To help protect your security, Internet Explorer has restricted this file from showing active content that could access your computer. Click here for options...

Commercial Print Job: Sample  Capable
Step: Preview Rates

Job
Definition
Press: Cover
Press: Text
Additional: Cover
Additional: Text
Assembly
Confirmation
Preview Rates Ratecard Prices Filter Vendors By: Region ▸     United Kingdom ▸

| Supplier | Press | | Price 10,000 ▵ | | Price @ Quantity 12,000 ▵ | |
|---|---|---|---|---|---|---|
| DemoVendor 1 | Offset | Capable | ☐ | £27,087.86 | ☐ | Capable |
| | Digital | Capable | ☐ | £27,087.86 | ☐ | Capable |
| DemoVendor 2 | Offset | Capable | ☐ | £27,734.68 | ☐ | Capable |
| | Digital | Capable | ☐ | £27,734.68 | ☐ | Capable |
| DemoVendor 3 | Offset | Capable | ☐ | £28,087.86 | ☐ | Capable |
| | Digital | Capable | ☐ | £27,734.68 | ☐ | Capable |

Commercial Print Job: Sample
Step: Preview Rates

Job
Definition
Press: Cover
Press: Text
Additional: Cover
Additional: Text
Assembly
Confirmation
Preview Rates Ratecard Prices Filter Vendors By: Region ▾

| | Price | | Price @ Quantity | |
|---|---|---|---|---|
| | 10,000 ▾ | | 12,000 United Kingdom ▾ | |
| Supplier | Price | | Price | |
| DemoVendor 1 | Incapable | ☐ | Incapable | ☐ |
| DemoVendor 2 | £24,392.46 | ☐ | £27,734.68 | ☐ |
| DemoVendor 3 | £26,375.22 | ☐ | £28,087.86 | ☐ |
| DemoBaseline | £22,573.22 | ☐ | £27,087.86 | ☐ |

700

FIG. 7 ously submitted by vendors (rate cards) or through live reverse auctions with such vendors. By allowing print procurement to occur without requiring rate cards, document advisers have the option of working with vendors who do not want to submit or negotiate contractually fixed digital print pricing.

DIGITAL PRINT PROCUREMENT USING REVERSE AUCTION

BACKGROUND AND SUMMARY

Embodiments herein generally relate to multiple printing entity systems, and more particularly to a method, service, and computer program product that utilizes reverse auctions to obtain and evaluate bids for a print job.

As document processing technologies advance, more complicated types of printing systems are becoming available and more specialization is occurring. It is common for those authors who create printable material to outsource the actual printing of the material. However, such authors understandably desire to have the printing process be performed in a high quality manner for a reasonable price. The embodiments herein provide methods of communicating with different print entities (print shops, printers, etc.). The methods herein receive a print job and evaluate the print job as a digital print job and/or an offset print job. The digital print job is primarily characterized (for pricing purposes) by the number of images within the print job, while the offset print job is primarily characterized (for pricing purposes) by the number of sheets within the print job. Although digital production is characterized primarily by number of images vs. number of sheets in offset, rate cards and pricing are based upon the number of different components of the print job such as preflight, press, postpress, finishing, assembly and fulfillment. Secondary characterizations (for pricing purposes) can include quality, sheet size, turnaround time, etc.

The methods herein can perform a live reverse auction for the digital print job and/or the offset print job by offering the digital print job and the offset print job to a plurality of printing entities and receive bids for the digital print job and the offset print job from the printing entities. The "live" reverse auction is performed dynamically through a network to which the printing entities are connected The bids for the digital print job are based primarily upon the number of images within the digital print job, and the bids for the offset print job are based primarily upon the number of sheets within the offset print job. The bids are evaluated to rank the bids (or to rank the printing entities) into a ranking, which is output.

Different embodiments can perform an off-line reverse auction for the digital print job that is based on information previously stored in a database. The off-line reverse auction compares the digital print job to a plurality of rate cards previously submitted by the printing entities. In a similar manner, the rate cards are based primarily upon numbers of production parameters, price points and images within digital print jobs or numbers of pages within offset print jobs. Then, these embodiments evaluate the preview pricing derived from the rate cards to rank the printing entities into a ranking, which is output.

Other embodiments herein can determine whether the printing entities have a capability to execute the print job. Further, some embodiments can perform an optimization process for selecting the best production method based upon minimum price and wastage to evaluate and rank the bid or printing entities.

The embodiments herein provide reverse auctioning tools for print procurement, which allows document advisors (DA) to generate savings for customers by selecting and awarding print jobs to vendors who offer lowest pricing and optimum production methods, based upon contractual rates and capabilities previously submitted by vendors (rate cards) or through live reverse auctions with such vendors. By allowing print procurement to occur without requiring rate cards, document advisers have the option of working with vendors who do not want to submit or negotiate contractually fixed digital print pricing.

These and other features are described in, or are apparent from, the following detailed description.

BRIEF DESCRIPTION OF THE DRAWINGS

Various exemplary embodiments of the systems and methods are described in detail below, with reference to the attached drawing figures, in which:

FIG. 3 is a schematic representation of a graphic user interface screen shot according to an embodiment herein;

FIG. 5 is a schematic representation of a graphic user interface screen shot according to an embodiment herein;

FIG. 6 is a schematic representation of a graphic user interface screen shot according to an embodiment herein; and FIG. 7 is a schematic representation of a graphic user interface screen shot according to an embodiment herein.

DETAILED DESCRIPTION

Figure 1:
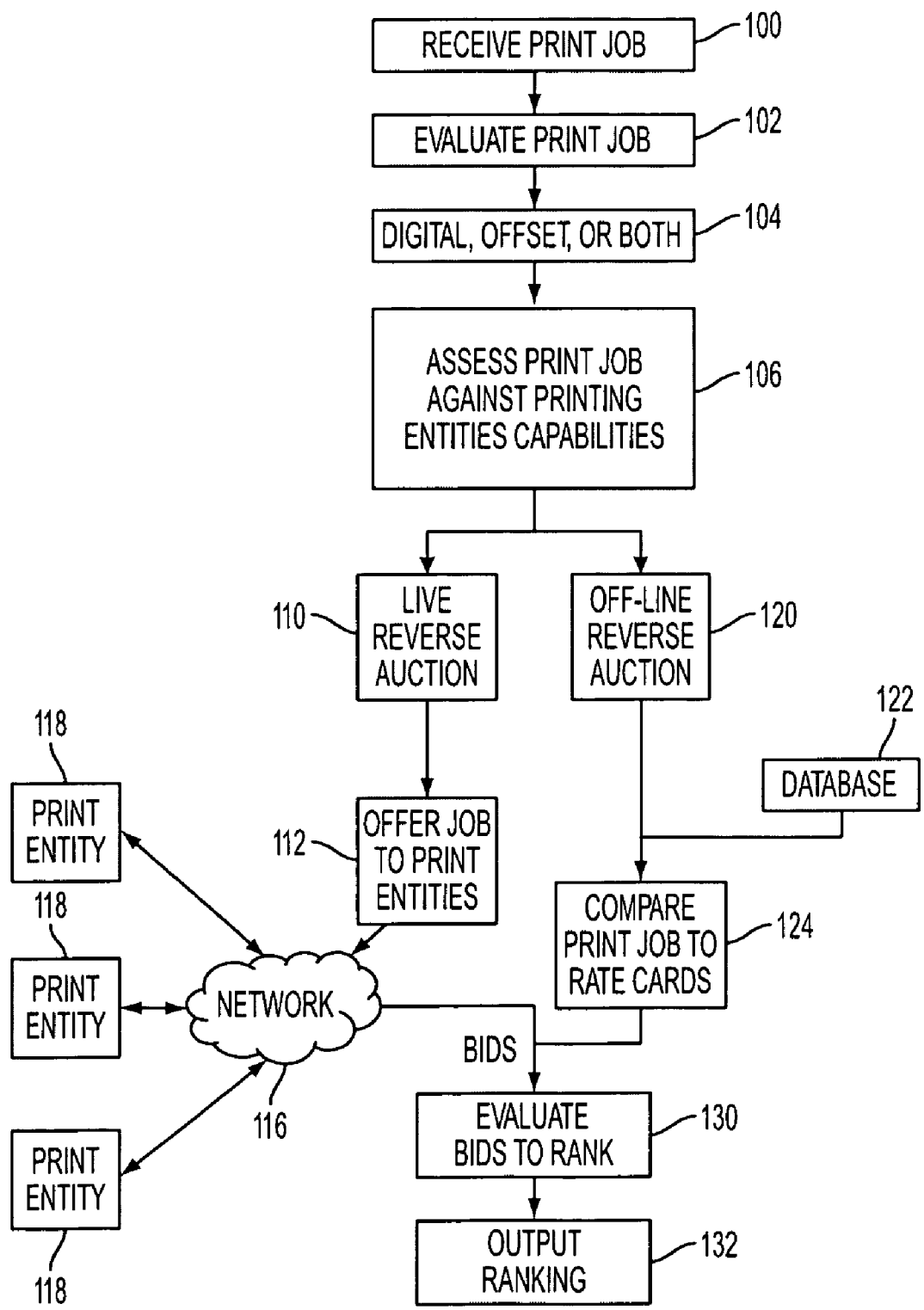
FIG. 1 is a flow diagram illustrating an embodiment herein.

As mentioned above, the embodiments herein provide a method of communicating with different print entities (print shops, printers, etc.). As shown in flowchart form in FIG. 1, the methods herein receive a print job in item 100 and evaluate the print job 102 as either a digital print job and/or an offset print job 104. The digital print job is primarily characterized (for pricing purposes) by the number of images within the print job, while the offset is primarily characterized (for pricing purposes) by the number of sheets within the print job. Secondary characterizations (for pricing purposes) can include quality, sheet size, turnaround time, etc.

Whether the print job is classified as a digital print job, an offset print job, or both (104) depends upon user preferences and upon the nature of the print job itself. Offset printing generally involves street reproduction of pages without alteration. To the contrary, digital printing generally allows flexibility in the appearance of the printing, depending upon the graphical nature of the printing, the size of the paper utilized, etc. Therefore, digital print jobs are generally more sophisticated than offset print jobs and the digital print jobs can utilize more ink choices, more resolution choices, more operating system choices, more sheet sizes, etc. when compared to offset print jobs. Embodiments herein allow the user to designate whether their print job should be evaluated as a digital print job, an offset print job, or be evaluated as both a digital print job and an offset print job, so that costs of the two can be compared.

Further, embodiments herein can also determine whether the printing entities have the capability to execute the print job in item 106. Those printing entities that do not have the capability to execute the print job being bid on are eliminated. Each vendor's list of digital print capabilities is evaluated to determine if the vendor can produce the job 106 and the list of capable or incapable vendors is generated.

The methods herein can perform a live reverse auction for the digital print job and/or the offset print job by branching to item 110. The live reverse auction process offers the digital print job and the offset print job to a plurality of printing entities 118 in item 112 and receives bids for the digital print job and the offset print job from the printing entities in item 114.

The "live" reverse auction is performed dynamically through a network 116 (wide area network or local area network) to which the printing entities 118 are connected. The bids for the digital print job are based primarily upon the number of images within the digital print job, and the bids for the offset print job are based upon the number of sheets within the offset print job. Secondary characterizations (for pricing purposes) can include quality, sheet size, turnaround time, etc. The processes and systems involved with performing reverse auctions are well known to those ordinarily skilled in the art, and a detailed discussion of the same is not included herein. For example, for reverse auction systems and methods see U.S. Patent Publication Numbers 2004/0246967; 2005/0049937; and 2006/0167816 (the complete disclosures of which are incorporated herein by reference).

If an off-line reverse auction is to be performed, processing branches to item 120. The off-line reverse auction is based on information previously stored in a database 122. More specifically, printing vendors who desire to participate can agree to contractual rates in advance and such rates are recorded as rate cards. However, some printing vendors may desire to not supply previously contracted rates and such vendors would not have rate cards within the database 122. Irrespective of whether a printing vendor has a rate card within the database 122, all vendors can participate in the live reverse auction 110.

In item 124, the off-line reverse auction compares the digital print job to a plurality of rate cards previously submitted by the printing entities that are stored in the database 122. In a similar manner, the rate cards are based primarily upon numbers of images within digital print jobs or numbers of pages within offset print jobs. For example, ratecards can be based upon 1000+ pricing points used by vendors for estimating job prices for both offset and digital production methods. Secondary characterizations (for pricing purposes) can include quality, sheet size, turnaround time, etc. In item 130, the bids are evaluated to rank the bids (or to rank the printing entities) into a ranking. Some embodiments can perform an optimization process to evaluate and rank the bid or printing entities.

The ranking is output in the item 136. Jobs can be submitted to vendors who are incapable, meaning they do not have the capability of producing it. The reason for this is that vendors can still have the option of either sub-contracting the job or do it in a manner which falls outside what the system recommends.

The choice of whether the live reverse auction process 110 or the off-line reverse auction process 120 is performed depends upon the preferences of the user who created the print job and whether there are a sufficient number of vendors who have previously recorded rate cards in the database 122. The print job creator can choose the live reverse auction, the off-line reverse auction, or both depending upon availability).

In addition, when offering the print job to the print entities 112 and when comparing the print job to the rate cards 124, the method can request bids for digital printing only, offset printing only, or bids for both digital and offset printing (again, depending upon user preferences). Therefore, based primarily upon user entered configurations (offset only/digital only/both), different print options are presented to the buyer. Vendors who possess digital print capability will represent their capability by functionally mapping their digital presses to the presstypes specified in the application setup.

Thus, as shown above, if digital rates do not exist, or if the buyer desires to use the live reverse auction option, job specs are submitted to vendors for pricing 112, thereby launching a spot market. If digital rates exist, a list of vendors is generated based primarily upon their capabilities and best pricing available 124. With embodiments herein, vendors are allowed to bid on print jobs. The best prices generated based upon the spot market or vendor bidding are submitted to buyers. Buyers then select the best vendor price and the job is awarded to that vendor.

Figure 2:
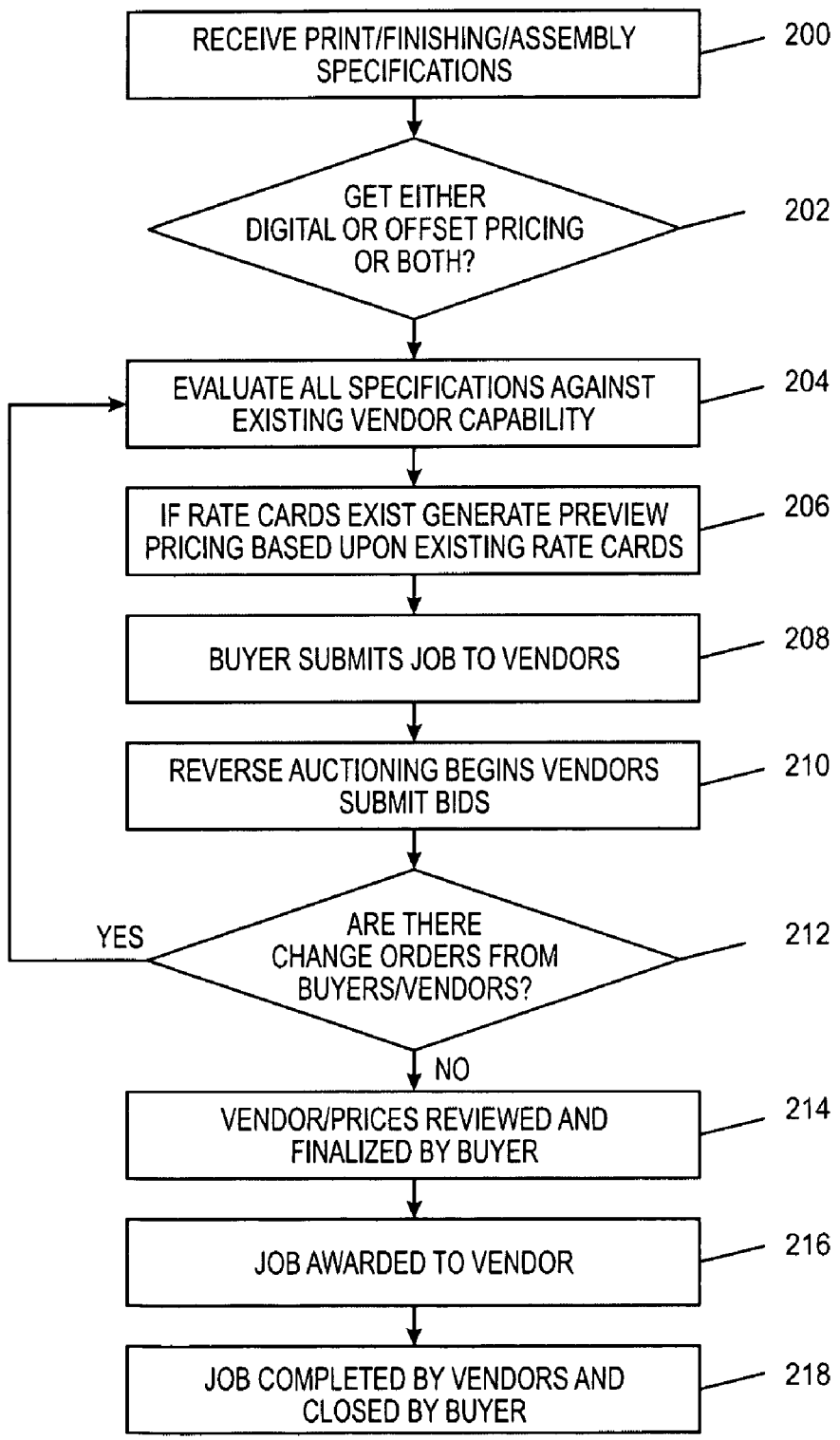
FIG. 2 is a schematic representation of a graphic user interface screen shot according to an embodiment herein.

In another embodiment shown in FIG. 2, one method herein can use both rate cards and reverse auctions. In item 200, the method receives print/finishing/assembly specifications. Then, in item 202, the method decides whether to get pricing for digital/offset printing methods, or both. In item 204, the method evaluates all specifications against existing vendor capabilities. In item 206, if rate cards exist, the method generates preview pricing based upon existing rate cards. Next, in item 208, the buyer submits the job to the vendors. In item 210, the reverse auction begins when vendors submit bids. Next, in item 212, the method determines if there are any changes orders from buyers or vendors. If there are change orders, the method returns to item 204. If there are no change orders from buyers or vendors 212, the vendor/prices are reviewed and finalized by the buyer in item 214. Next, in item 216, the job is awarded to the vendor. In item 218, the job is completed by vendors and closed by the buyer.

One feature of the embodiments herein addresses the situation where contracted rates with digital printing service suppliers may not be setup during the sourcing engagement. Optimum pricing for jobs can be achieved independently of pre-contracted rates, based upon the spot market and bidding among participating vendors. As an alternative to pre-contracted rates, regional rates, national rates or a single default rate for all print vendors can be used for getting print job prices. These rates could be determined by one or more designated groups ex: sales, production teams etc.

Options to select print specifications specific to digital printing (ex: ink types, inline finishing) are provided when entering print specifications for a job, if the digital press type is selected by the user. The digital press type can include all digital print devices grouped on the basis of print capability and other attributes such as sheet sizes, paper stock etc.

All of the processes described herein can be fully automated or can involve manual assistance. For example, the reverse auction process as described herein can be utilized by document assistants who are acting as brokers for the users print job. In this example, the document assistants would evaluate the user's needs and create a highly specific bid request that is offered to the various print entities.

Therefore, print buyers can, for example, choose one of at least four options available for digital print procurement. The first option is digital pricing with rate cards which would be processed as an off-line reverse auction 120.

Figure 4:
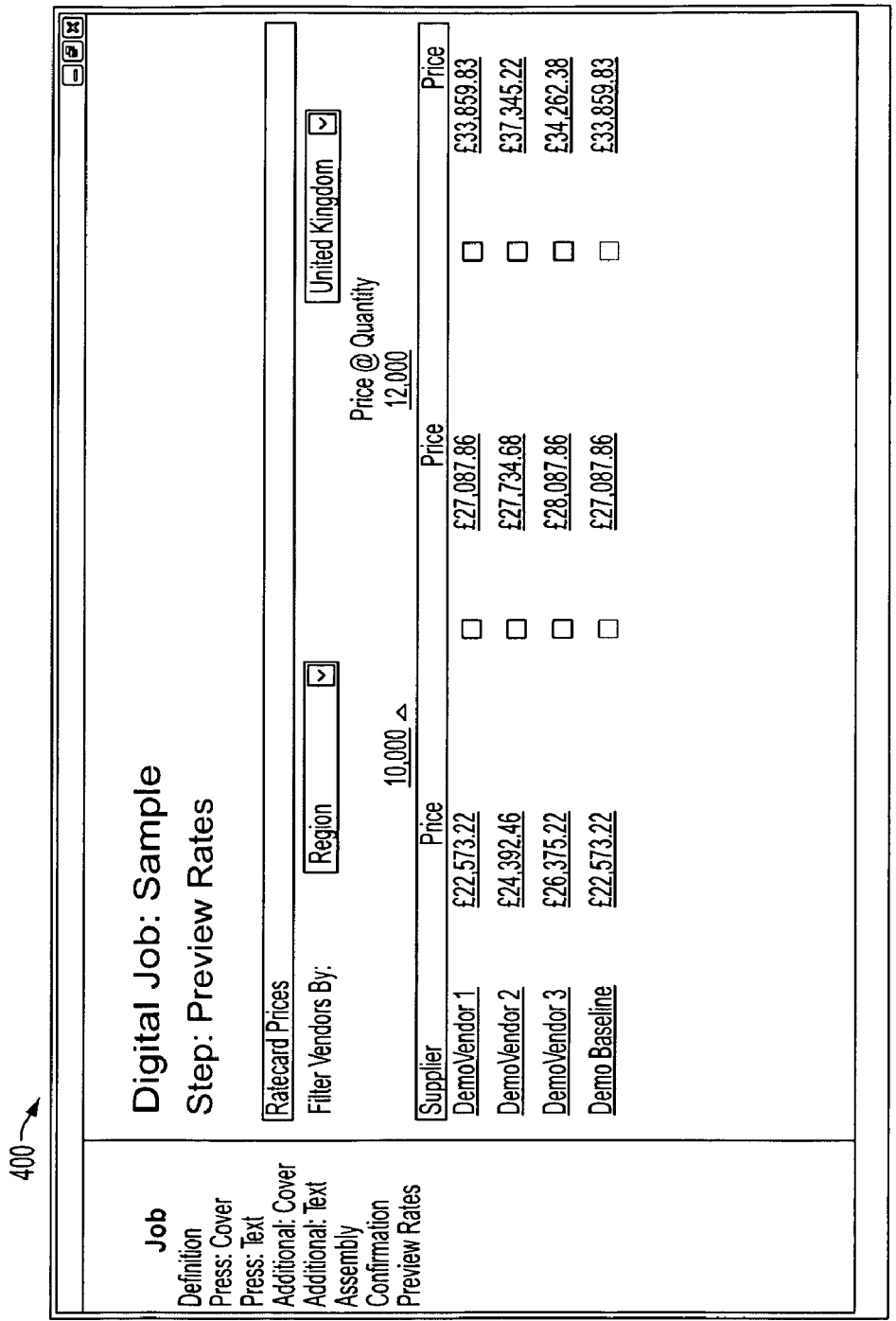
FIG. 4 is a schematic representation of a graphic user interface screen shot according to an embodiment herein.

In this first option, a buying organization with access to the database information of vendors with digital print capability can be utilized. One or more digital presses can be specified under the digital press type for a vendor. When a job is specified, as shown by a screenshot 300 in FIG. 3, optimization will occur based upon the most suitable and economical digital press available. Therefore, in screenshot 300, the press type (digital or offset), color, coverage, paper, pages, duplex, 4-color, coverage, #PMS, coverage, # metallic, coverage, sealer, total coating, etc., is specified by the user. From this information, preview prices for different suppliers and different print quantities are generated as shown in the screenshot 400 and FIG. 4. Once again, in this first exemplary option, only contract rates for digital printing will be available.

In a second option, digital pricing without rate cards is performed using the live reverse auction 110. Again, a buying organization with network access to vendors with digital print capability can be utilized. One or more digital presses can again be specified under the digital press type for a vendor. When the print job is specified, optimization will occur based upon the most suitable and economical digital press available. In contrast to the first option, in this second option, contract rates for digital printing will not be available.

In a third option, (offset/digital pricing with rates), the live reverse auction 110 and the off-line reverse auction 120 are utilized with rate cards. A digital press type will again appear in addition to the existing press types. Also, one or more digital presses can be specified under the digital press type for a vendor. A vendor may define for themselves one or more digital presses based upon their capability. When the print job is specified, optimization will occur based upon the most suitable and economical press type and press available in item 124. Because this option reviews both offset and digital pricing, this third option allows buyers to compare print prices between offset printing and digital printing based upon preview rates for different print quantities, as shown in the screenshot 500 in FIG. 5. In this third option, contract rates for all press types will be available and optimum prices can be achieved based upon the spot market and bidding amongst the capable vendors.

A fourth option is for both offset printing and digital printing, without rate cards. With this option, a digital press type will also appear in addition to the existing press types and one or more digital presses can be specified under the digital press type for a vendor. Under this fourth option, a vendor may define for themselves one or more digital presses based upon their capability. When a job is specified, optimization will occur based upon the most suitable and economical press type and press available. This will allow buyers to compare print prices between offset printing and offer specs to digital printers for bidding. Because this fourth option is not based upon rate cards, contract rates will not be available. As shown in the screenshot 600 in FIG. 6, the capability of the different vendors is illustrated in addition to offset and digital printing prices for different quantities. Again in this option, optimum prices will be achieved based upon spot market and bidding amongst capable vendors. While four options are discussed above, the embodiments herein are not limited to only these four options and are, instead, applicable to any other options and combinations of the options discussed herein.

Thus, embodiments herein can assess jobs based upon vendor capability only without any rate cards to allow document assistants to include vendors who have not previously submitted digital rates, to thereby achieve better pricing. Given the fact that obtaining digital rates from vendors is a challenge in the commercial print marketplace, this feature will allow greater competition. Overall, this process will allow buyers (document assistants) to include digital print in the total print volume they procure for their clients, and thereby achieve greater savings.

With respect to the evaluation of the printing entities capabilities in item 132, discussed above, in the absence of this functionality buyers might be presented with estimated prices for jobs even for printing vendors who did not have the capability of producing the specified print job. In an increasingly segmented and specialized market, one-size-fits all generalizations about equipment feature can lead to incorrect conclusions about vendor capabilities and pricing.

By collecting vendor capabilities upfront in the sourcing process, the embodiments herein are able to come up with preview pricing only for vendors who possess the physical capability of producing the print job. One aspect of procurement operations herein involves an initial sourcing phase during which information related to rates and capability is collected from printing vendors. Vendors are able to specify the production equipment they have (offset and/or digital) in terms of print volume constraints, limitations related to the kind of paper stock that can be used, inline and offline finishing services, etc. The database 122 will store this information in each vendor's profile.

When a buyer specifies a job, the application evaluates it against the vendor profile to assess if the specific vendor has the required capability to produce it in item 132. If the vendor cannot produce the job the buyer is informed accordingly. For example, as shown in the screenshot 700 in FIG. 7, instead of showing the first vendor's bids for the various print quantities, the term "incapable" could be placed on the screenshot 700 to indicate that the first vendor is not capable of handling the print job.

In other embodiments herein, the buyer (the creator of the print job or document assistant) can be provided with the option of submitting the job to the incapable vendor. For example, the buyer may understand that the vendor, while being incapable of performing the print shop, may be providing the print services through some alternative sources. This capability allows vendors to more accurately describe their capabilities, and describe their preferred job type and also allows the buyer to narrow down the list of suppliers who can produce the job, thereby improving the bidding process, and achieving better pricing and savings.

Various computerized devices such as servers and workstations are mentioned above. Computers that include input/output devices, memories, processors, etc. are readily available devices produced by manufactures such as International Business Machines Corporation, Armonk N.Y., USA and Apple Computer Co., Cupertino Calif., USA. Such computers commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Stamford, Conn., USA and Visioneer, Inc. Pleasanton, Calif., USA and the details of such devices are not discussed herein for purposes of brevity and reader focus.

The word "printer" as used herein encompasses any apparatus used primarily for commercial print production, such as a digital copier, bookmaking machine, multi-function machine, etc. which performs a print outputting function for any purpose. The details of printers, printing engines, etc. are well-known by those ordinarily skilled in the art and are discussed in, for example, U.S. Pat. No. 6,032,004, the complete disclosure of which is fully incorporated herein by reference. Printers are readily available devices produced by manufactures such as Xerox Corporation, Stamford, Conn., USA. Such printers commonly include input/output, power supplies, processors, media movement devices, marking devices etc., the details of which are omitted herefrom to allow the reader to focus on the salient aspects of the embodiments described herein.

Some conventional systems (such as that disclosed in the U.S. Pat. No. 7,065,567, the complete disclosure of which is incorporated herein by reference) split the printing over more than one printer where there are several copies to be made. Subsystems can also split the printing over more than one printer for a single copy. Cluster printing specifies a group of printers from which a print job can be performed. Color/black-and-white page splitting splits a printer job, sending non-color pages to black-and-white printers and sending pages with color, to color printers. Embodiments herein are equally applicable to such print sharing and splitting systems and methods.

All foregoing embodiments are specifically applicable to electrostatographic and/or xerographic machines and/or processes as well as to software programs stored on the electronic memory (computer usable data carrier) and to services whereby the foregoing methods are provided to others for a service fee. It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof.

What is claimed is:

1. A method comprising: receiving a print job through a computerized network; evaluating said print job as a digital print job that is characterized by the number of images within said digital print job; evaluating said print job as an offset print job that is characterized by the number of sheets within said offset print job; performing, by a computer, a reverse auction for both said digital print job and said offset print job through said computerized network by offering both said digital print job and said offset print job to a plurality of printing entities and receiving bids for at least one of said digital print job and said offset print job from said printing entities, wherein said bids for said digital print job are based upon said number of images within said digital print job and wherein said bids for said offset print job are based upon said number of sheets within said offset print job; evaluating, by a computer, said bids to rank said bids into a ranking; and outputting said ranking.

2. The method according to claim 1, wherein said evaluating comprises determining whether said printing entities have a capability to execute said digital print job.

3. The method according to claim 1, wherein said evaluating comprises determining whether said printing entities have said capability to execute said offset print job.

4. The method according to claim 1, wherein said evaluating comprises performing an optimization process to rank said bids.

5. A method comprising: receiving a print job through a computerized network; evaluating said print job as a digital print job that is characterized by the number of images within said digital print job; evaluating said print job as an offset print job that is characterized by the number of sheets within said offset print job; performing, by a computer, a reverse auction for both said digital print job and said offset print job through said computerized network by comparing both said digital print job and said offset print job to a plurality of rate cards previously submitted by a plurality of printing entities, wherein said rate cards for said digital print job are based upon numbers of images within digital print jobs and wherein said rate cards for said offset print job are based upon said number of sheets within said offset print job; evaluating, by a computer, said rate cards to rank said printing entities into a ranking; and outputting said ranking.

6. The method according to claim 5, wherein said evaluating comprises determining whether said printing entities have a capability to execute said digital print job.

7. The method according to claim 5, wherein said evaluating comprises determining whether said printing entities have said capability to execute said offset print job.

8. The method according to claim 5, wherein said evaluating comprises performing an optimization process to rank said printing entities.

9. A method comprising: receiving a print job through a computerized network; evaluating said print job as a digital print job that is characterized by the number of images within said digital print job; evaluating said print job as an offset print job that is characterized by the number of sheets within said offset print job; performing, by a computer, a reverse auction for both said digital print job and said offset print job through said computerized network by offering said digital print job and said offset print job to a plurality of printing entities and receiving bids for both said digital print job and said offset print job from said printing entities, and by comparing both said digital print job and said offset print job to a plurality of rate cards previously submitted by a plurality of printing entities, wherein said bids for said digital print job are based upon said number of images within said digital print job, and wherein said bids for said offset print job are based upon said number of sheets within said offset print job; evaluating, by a computer, said bids and said rate cards to rank said bids into a ranking; and outputting said ranking.

10. The method according to claim 9, wherein said evaluating comprises determining whether said printing entities have a capability to execute said print job.

11. The method according to claim 9, wherein said evaluating comprises determining whether said printing entities have said capability to execute said offset print job.

12. The method according to claim 9, wherein said evaluating comprises performing an optimization process to rank said bids.

13. A non-transitory computer-usable data carrier storing instructions that, when executed by a computer, cause the computer to perform a method comprising: receiving a print job through a computerized network; receiving a print job through a computerized network; evaluating said print job as a digital print job that is characterized by the number of images within said digital print job; evaluating said print job as an offset print job that is characterized by the number of sheets within said offset print job; performing a reverse auction for both said digital print job and said offset print job through said computerized network by offering at least one of both said digital print job and said offset print job to a plurality of printing entities and receiving bids for at least one of said digital print job and said offset print job from said printing entities, wherein said bids for said digital print job are based upon said number of images within said digital print job and wherein said bids for said offset print job are based upon said number of sheets within said offset print job; evaluating said bids to rank said bids into a ranking; and outputting said ranking.

14. The method according to claim 13, wherein said evaluating comprises determining whether said printing entities have a capability to execute said digital print job.

15. The method according to claim 13, wherein said evaluating comprises determining whether said printing entities have said capability to execute said offset print job.

16. The method according to claim 13, wherein said evaluating comprises performing an optimization process to rank said bids.

* * * * *